C. F. BRUSH.
GALVANIC BATTERY.
No. 185,288.  Patented Dec. 12, 1876.
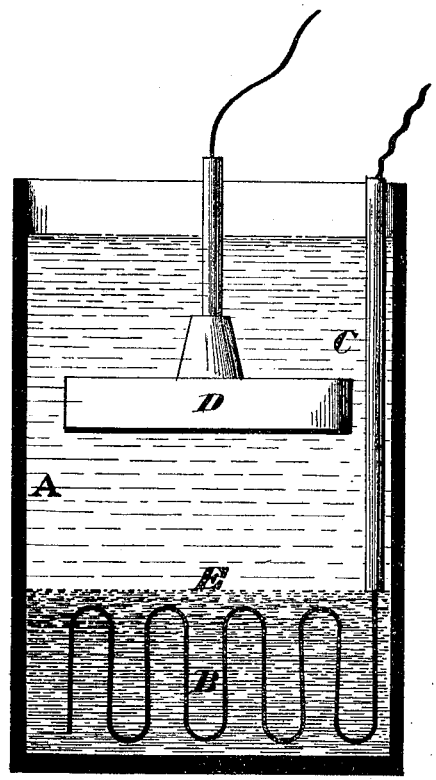
WITNESSES
INVENTOR

UNITED STATES PATENT OFFICE.

CHARLES F. BRUSH, OF CLEVELAND, OHIO, ASSIGNOR OF ONE-HALF HIS RIGHT TO THE TELEGRAPH SUPPLY COMPANY, OF SAME PLACE.

IMPROVEMENT IN GALVANIC BATTERIES.

Specification forming part of Letters Patent No. 185,288, dated December 12, 1876; application filed August 28, 1876.

*To all whom it may concern:*

Be it known that I, CHARLES F. BRUSH, of Cleveland, in the county of Cuyahoga and State of Ohio, have invented certain new and useful Improvements in Galvanic Batteries; and I do hereby declare the following to be a full, clear, and exact description of the invention, such as will enable others skilled in the art to which it pertains to make and use it, reference being had to the accompanying drawings, which form part of this specification.

My invention relates to an improved galvanic battery, in which the negative element is surrounded by the oxychloride of lead.

In the ordinary sulphate-of-copper or gravity battery, especially when not in action, the sulphate-of-copper solution gradually diffuses itself through the zinc solution, even when the latter is protected by a porous cell, and attacks the zinc plate, forming a deposit of metallic copper thereon. Thus the copper solution is rapidly wasted, and a disastrous "local action" induced.

I overcome this difficulty by substituting, for the sulphate of copper in such batteries, the oxychloride of lead, and for the copper plate a plate of lead, although other metals or carbon may be used. The lead compound, being at best but very slightly soluble in the liquid employed to excite the battery, cannot diffuse and attack the zinc element, however long the battery may remain idle.

In forming the battery, a lead plate, or, preferably, a ribbon of sheet-lead loosely rolled up, is placed in the bottom of a glass or other suitable jar or vessel, and embedded in a sufficient quantity of the oxychloride. The zinc element, which may be of any convenient shape, is suspended in the upper part of the jar, in the manner customary in "gravity-batteries."

The zinc should be amalgamated, but may be used without, if necessary. The jar is finally filled with a dilute solution of chloride or sulphate of zinc, or other saline solution, but, preferably, with a weak solution of chloride of sodium or ammonia.

When the battery is in action, metallic lead is reduced from the oxychloride, and forms a spongy crystalline deposit on the lead plate. The free chlorine from the oxychloride unites with the free hydrogen and forms hydrochloric acid. The oxygen of the oxychloride unites, also, with a portion of the free hydrogen, and forms water. The hydrochloric acid does not remain in solution, but at once attacks the zinc element, forming chloride of zinc.

When chloride of sodium is used as the primary exciting liquid in connection with the oxychloride of lead, some oxychloride of zinc is also formed, but does not interfere with the action of the battery; but when chloride of ammonium is used, the oxide of lead contained in the oxychloride is reduced to the metallic state, as before, chloride of zinc and free ammonia being formed, but no oxychloride of zinc.

In the drawing is shown a vertical transverse section of a battery-cell constructed according to my invention. A is the outer cell; B, the lead plate or ribbon attached to an insulated wire, C, which forms one of the poles of the battery. The zinc element D may be of any convenient form, and is suspended in the upper part of the jar or cell, as shown. E represents the oxychloride of lead embedding the lead element B.

When the battery is to be used, the cell is filled with the exciting liquid to such extent as to cover the zinc element. The battery-jar may be covered to prevent evaporation, if desired.

I am aware that chloride of lead has been employed in the place where I employ oxychloride; but I have found by experiment that the oxychloride is preferable in many ways. It is much cheaper, more easily attainable than chloride, and acts doubly— that is, the oxygen of the oxychloride serves to unite with the free hydrogen and forms water, while the chlorine also unites with the free hydrogen and forms hydrochloric acid, thus acting with double certainty as a depolarizer. The hydrochloric acid at once attacks the zinc element and forms chloride of zinc, leaving the solution free of hydrochloric acid.

What I claim as my invention, and desire to secure by Letters Patent, is—

1. A galvanic battery in which oxychloride of lead is used as a depolarizing or hydrogen-absorbing agent, substantially as and for the purpose described.

2. In a galvanic battery, the combination of the lead element B, or its equivalent, with oxychloride of lead, substantially as and for the purpose described.

3. In a galvanic battery, the lead element B, or its equivalent, and oxychloride of lead, in combination with the zinc element D, and a solution of chloride of sodium or its equivalent, substantially as and for the purpose described.

In testimony whereof I have signed my name to this specification in the presence of two subscribing witnesses.

CHARLES F. BRUSH.

Witnesses:
FRANCIS TOUMEY,
JAMES P. WALSH.